(12) United States Patent
Gandhi

(10) Patent No.: US 8,914,348 B2
(45) Date of Patent: Dec. 16, 2014

(54) SYSTEM AND METHOD FOR ANALYZING SEARCH ENGINE OPTIMIZATION PROCEDURES

(76) Inventor: Mitul Gandhi, Des Plaines, IL (US)

( * ) Notice: Subject to any disclaimer, the term of this patent is extended or adjusted under 35 U.S.C. 154(b) by 0 days.

(21) Appl. No.: 12/882,259

(22) Filed: Sep. 15, 2010

(65) Prior Publication Data

US 2012/0066211 A1   Mar. 15, 2012

(51) Int. Cl.
*G06F 7/00* (2006.01)
*G06F 17/30* (2006.01)

(52) U.S. Cl.
CPC ...... *G06F 17/30864* (2013.01); *G06F 17/3089* (2013.01)
USPC .......................................................... 707/706

(58) Field of Classification Search
CPC .................................................. G06F 17/3089
USPC .......................................... 707/706, 999.003
See application file for complete search history.

(56) References Cited

U.S. PATENT DOCUMENTS

2003/0208578 A1* 11/2003 Taraborelli et al. ........... 709/223
2005/0246391 A1* 11/2005 Gross ............................. 707/200

* cited by examiner

Primary Examiner — Aleksandr Kerzhner
(74) Attorney, Agent, or Firm — Klkintworth & Rozenblat IP LLC

(57) ABSTRACT

A system and method for search engine optimization includes monitoring a website for changes in content; logging traffic to the website; analyzing data regarding the traffic to determine a relationship between the content and traffic changes; monitoring ranking of the website in search results where a specific search keyword is used; aggregating data regarding using a selected keyword and ranking of the website in results of searches including that keyword; analyzing the data to determine a relationship between the keyword and the ranking; and displaying those relationships. The website may also be monitored for changes in a number of links to the website; data regarding the links is analyzed to determine a relationship between changes in the number of links and changes in traffic. A benchmark may also be calculated; the effect of changing website content and/or changing the number of links is evaluated according to the benchmark.

14 Claims, 5 Drawing Sheets

SYSTEM AND METHOD FOR ANALYZING SEARCH ENGINE OPTIMIZATION PROCEDURES

FIELD OF THE DISCLOSURE

This disclosure relates to business intelligence and marketing management systems, and more particularly to facilitating online marketing efforts related to improving traffic from search engine results.

BACKGROUND OF THE DISCLOSURE

Search engines help individuals to find websites and online sources of information related to any topic of interest. Search engines typically do this in two ways: (1) organic or natural searching, which involves aggregating data from web pages across millions of websites and analyzing the data using algorithms to rank those websites in order of relevance to the particular query; (2) paid searching, which involves allowing websites to target users based on a keyword entered by a user and delivering advertising specific to that keyword by embedding the advertising in specific areas within the organic search results.

A website owner may have his site displayed as part of the search results presented to a user, typically in the "paid section" of the display, simply by paying the required amount. However, there is no such direct way to influence the results of a natural or organic search. Users evaluate the quality of a search engine primarily by the accuracy of its algorithm in returning results of websites that best match their query. Search engines are therefore designed to ensure that the results returned in the organic/natural section of their displayed search results are free from any undue influence, so that the returned results best meet the users' needs and not merely consist of links to companies having an interest in appearing in those results. Accordingly, search engines keep their algorithms a closely guarded secret.

However, through trial and error and considerable research, many of the important factors influencing the rankings of websites in natural searches have been established. At present there are numerous guidelines and best practices related to factors helpful to companies wishing to rank higher in search results. Companies involved in online advertising have great interest in these factors, because the higher a website is ranked in search results for popular queries, the more visitors the site receives. Any improvement in ranking for a website can be highly lucrative for a company selling products or services online, since there is no direct cost for the resulting increase in traffic to the site (and likewise no direct cost for any resulting sales or leads).

These factors have fostered growth of the field of Search Engine Optimization (SEO). SEO practitioners claim to have a higher than average level of knowledge of search engines' best practices, and offer their skills to companies wishing to improve their sites' rankings in natural search results and thus increase traffic to their websites.

SEO professionals generally focus on two areas to influence search engine rankings, called on-page optimization and off-site optimization respectively.

On-page Optimization

Search engines use the content on a webpage or website to understand what words and topic areas to which the page and site are most relevant. For example, a page that only has content related to baseball will be more relevant to "Baseball" than "Surgery". Search engines use advanced keyword analysis, content analysis, language analysis, etc. to pinpoint the topic areas and keywords to which the site is most relevant. Content in the form of text, sentences and words used in various locations of a web page is the primary determinant of whether a search engine will rank a page for a particular keyword; search engines use the content to build a "score" for the web page.

Off-site Optimization

Given the wide scope of the Internet, it is likely that there are many pages with the same or very similar content structure, keyword usage, etc. that would result in those pages having an identical "content score." In order to choose which of two pages (A and B) will appear higher in the search result rankings, search engines look for how many other websites link to each page, to determine which of the two has greater "authoritativeness" and "reliability." Thus if more websites link to page A than to page B, the search engine infers that page A is more relevant, popular and authoritative than page B, and page A will have a higher ranking.

Search engine optimizers seek to influence the ranking of their target websites within the search engine results by attempting to influence the two key factors above. In order to track their efforts, search engine optimizers implement changes to the page or site content, acquire more links from different websites, and then track any resulting changes in rankings (that is, ranking in search results from a given keyword or phrase) to see whether those efforts had any impact on the ranking. Some search optimizers also analyze overall traffic to the target page using web analytics tools (e.g. tools that track and measure visitors to websites), and try to associate increases in traffic with their efforts.

These search engine optimization processes are labor intensive and disconnected. Changes made to page content, or the number of links acquired, take time to be observed by search engines. There is an unknown time delay between those changes being observed and the search engine algorithm re-ranking the page based on new data. Search engine optimizers generally check their rankings for specific keywords only periodically; this further complicates the analysis by distancing the event (e.g. change in site content) from the results (change in search result ranking). In addition, with every change in content or every link acquired the rankings may change—not only for a specific keyword, but for many keyword combinations and related concepts that the search engine may derive on the basis of its analysis of the content. This analysis itself is generally a fluid process.

No single tool is presently available permitting search engine optimizers to automatically track, report and analyze the specific cause-and-effect relationship between their optimization efforts and the impact on search engine rankings and keywords. Furthermore, no tools are available to help visualize the relationship between changes in rankings and changes in traffic. Accordingly, there is a need for a system and method for facilitating search engine optimizers' activities.

SUMMARY OF THE DISCLOSURE

The present disclosure addresses the above-described need by providing a method and system for optimizing search engine results relating to a website.

According to one aspect of the disclosure, a method includes monitoring the website for changes in content of the website; logging traffic to the website; analyzing data regarding the traffic to determine a relationship between the content changes and traffic changes; monitoring ranking of the website in search results, in accordance with a keyword used to specify the search; aggregating data regarding use of a selected keyword and ranking of the website in results of searches including that keyword; analyzing the aggregated data to determine a relationship between said selected keyword and said ranking; and displaying those relationships to a user. The method may also advantageously include monitoring the website for changes in a number of links to the website; logging links acquired by the website and removed from the website; and analyzing data regarding the links to determine a relationship between changes in the number of links and changes in traffic. In addition, a benchmark may be calculated; this benchmark may be characterized as a desired effect regarding a change in traffic to the website and/or a change in ranking of the website. The effect of changing website content and/or changing the number of links is then evaluated in accordance with the benchmark.

Furthermore, results of the data analysis are displayed so that the user may visualize cause-and-effect relationships between content and/or link changes with traffic and/or ranking changes. In an embodiment, reports are displayed of traffic to the website over a first specified time period, and ranking of the website over a second specified time period. These displayed reports may include graphs of traffic and ranking for the website and a log of changes in content of the website and changes in a number of links to the website. The reports may also include results of data analysis regarding a competitor website.

According to another aspect of the disclosure, a computer-readable storage medium has stored therein instructions for performing a method including monitoring, logging, aggregating, analyzing, and displaying as described above.

According to a further aspect of the disclosure, a system is provided for performing the above-described method; the system includes a server, a storage device, and a display device. The server is configured to monitor the website and aggregate and analyze data relating to changes in content and/or links and their effect on traffic and/or ranking of the website.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DETAILED DESCRIPTION

A method embodying the disclosure includes aggregating, analyzing and reporting data relating to search engine optimization activities carried on by a user (an SEO practitioner).

Figure 1A:
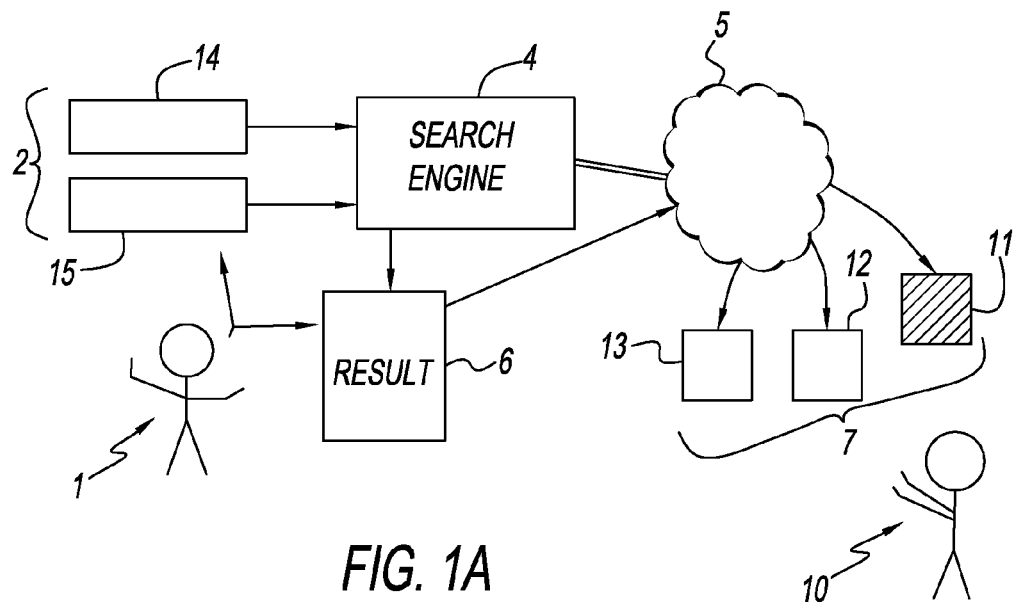
FIG. 1A schematically illustrates collection of data relating to traffic generated from a search engine to a particular web page.

FIG. 1A schematically illustrates monitoring traffic generated from a search engine to a particular webpage by a system according to an embodiment of the disclosure. A customer 1 (e.g. an online customer, seeking to visit websites via his browser) initiates a query to a search engine. The customer 1 composes a query 2 which includes one or more keywords 14, 15; these keywords are transmitted to search engine 4. Search engine 4 searches the Internet 5 for relevant web sites, and returns a set of results 6 which is displayed to customer 1. Customer 1 applies these results (e.g. by clicking through links provided on the results display) to retrieve and view content in websites 11-13. The input of keywords 14, 15 to search engine 4 thus generates traffic 7 for those websites. A system user 10 (e.g. an SEO practitioner), seeking to optimize traffic and ranking for website 11, uses the system to collect data relevant to traffic involving website 11.

Figure 1B:
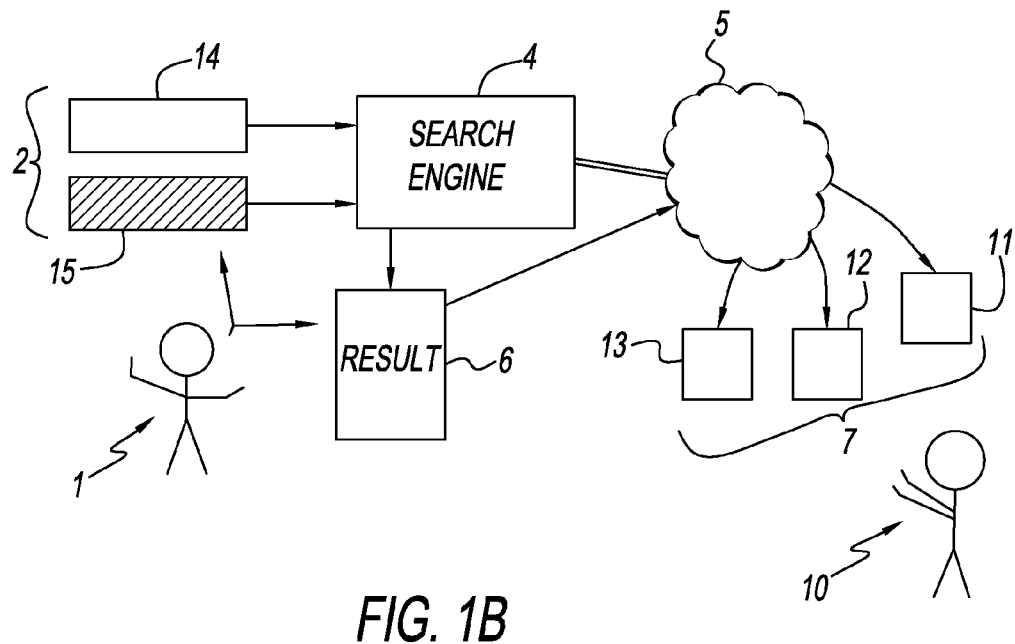
FIG. 1B schematically illustrates collection of data relating to traffic generated from a search engine from a particular keyword.

FIG. 1B schematically illustrates monitoring traffic from a search engine from a particular keyword by a system according to another embodiment of the disclosure. As in FIG. 1A, customer 1 transmits a query including keyword 15 to search engine 4. System user 10 uses the system to collect data relevant to the ranking of websites in search results generated from keyword 15. In this instance, user 10 monitors use of a particular keyword or phrase 15 and its effect on traffic to website 11. In particular, user 10 uses the system to analyze relationships between the keyword 15 and the ranking of website 11 in the results 6.

In an embodiment, the system collects data on a daily basis regarding the ranking of the target website (and/or a particular webpage) within the search results for specific keywords. The system also collects data regarding links acquired by the user to a particular webpage on the website.

Figure 2:
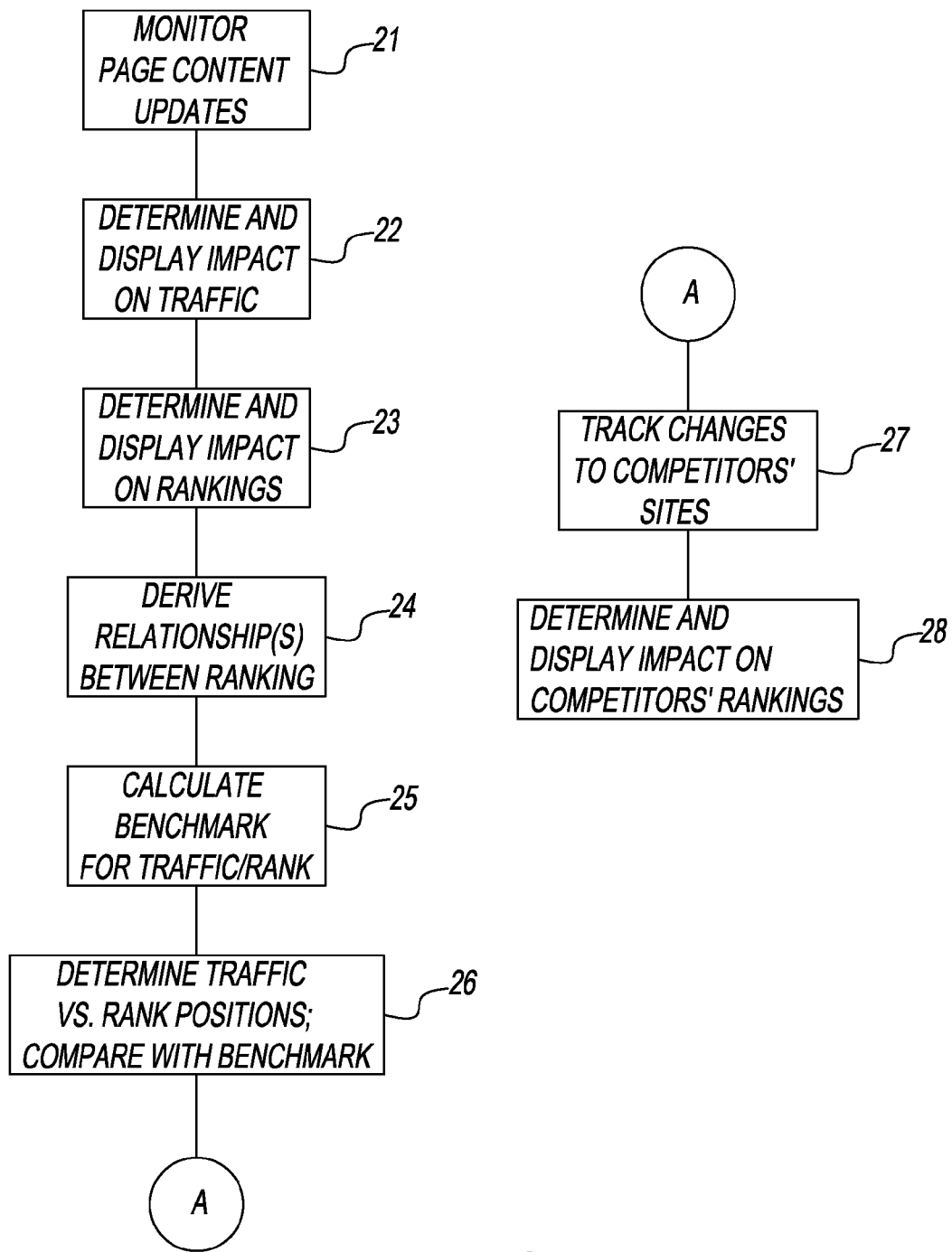
FIG. 2 is a flowchart showing steps in a method for tracking, logging and analyzing changes in traffic and rankings based on changes in website content, in accordance with an embodiment of the disclosure.

FIG. 2 is a flowchart illustrating a method for tracking and analyzing the impact of website changes on traffic and rankings. The system monitors the target web page (e.g. a page in website 11 in FIG. 1A), and tracks and logs changes and updates to the content of the page or new links to the page (step 21). The system determines the effect of the changes and updates, and displays the associated change in traffic to the user (step 22). The system furthermore determines and displays the impact on the rankings when specific keywords are used (step 23). The system uses this collected data to derive cause-and-effect relationships between particular keywords and the ranking of the target website (step 24). A benchmark is calculated (step 25) relating a given rank position to the level of traffic. The system then determines (step 26) whether the website is performing better or worse than the benchmark, based on the current rank position of the website. The benchmark is based on aggregated data across all users of the system, as well as specific data collected by the user over time.

The system also tracks and logs changes to competitors' web sites (step 27), and determines and displays to the user the impact of those changes (step 28).

Figure 3:
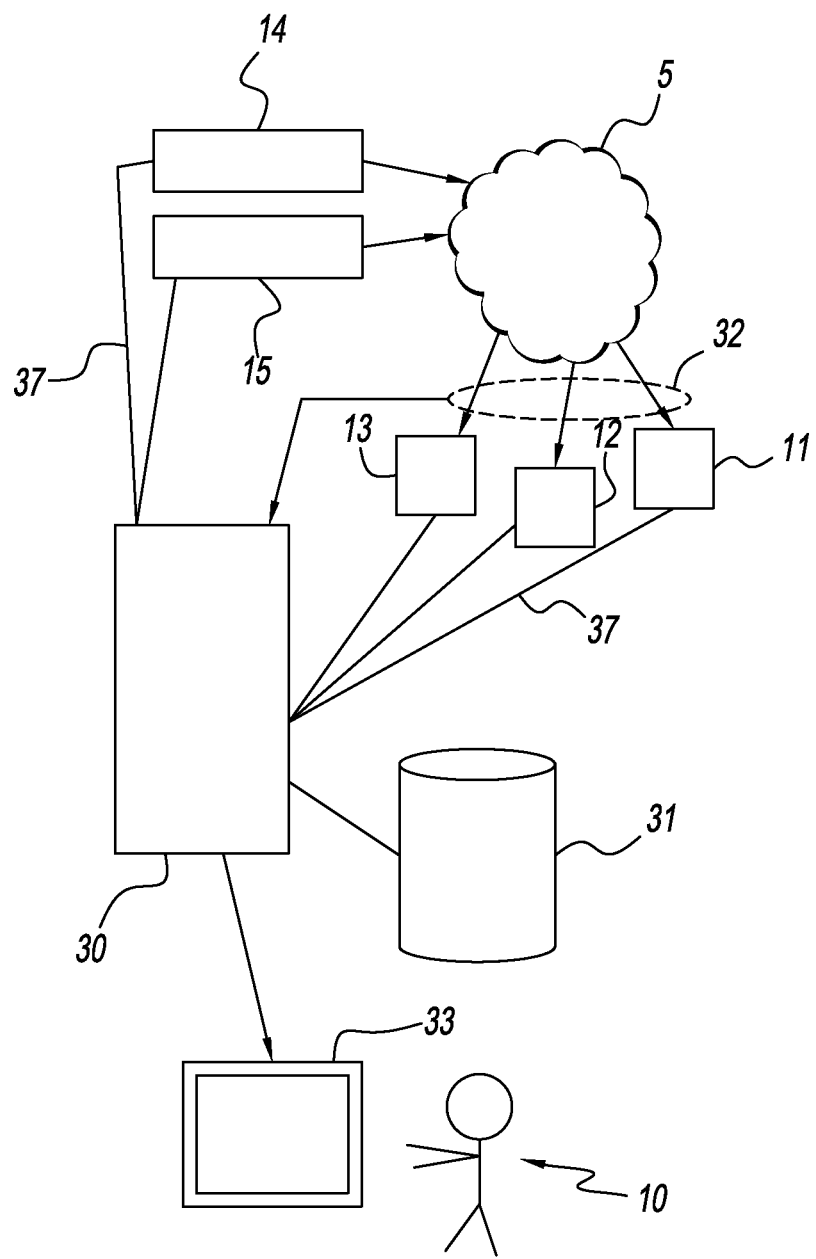
FIG. 3 schematically illustrates a system for implementing the method, in accordance with another embodiment of the disclosure.

FIG. 3 schematically illustrates a system embodying the disclosure. In this embodiment, instructions for performing the method are executed on server 30. It will be appreciated that server 30 need not be local to user 10, but may be remote and accessed by user 10 via the Internet. In accordance with the method, server 30 collects data relating to traffic 32; traffic 32 is generated in accordance with a query with specific keywords 14, 15. As shown in FIG. 3, server 30 monitors the use of keywords 14, 15 (monitoring is schematically illustrated by 37), and monitors changes to content (and/or changes in the number of links) of sites 11-13. The collected and logged data may be stored in storage unit 31. Storage unit 31 need not be directly connected to the server 30 as shown in FIG. 3, but may instead be accessible to the server over the Internet. Reports on the automatic logging of content changes and traffic, and the relationship between rankings and traffic from a given keyword, are displayed to user 10 on display unit 33.

Figure 4:
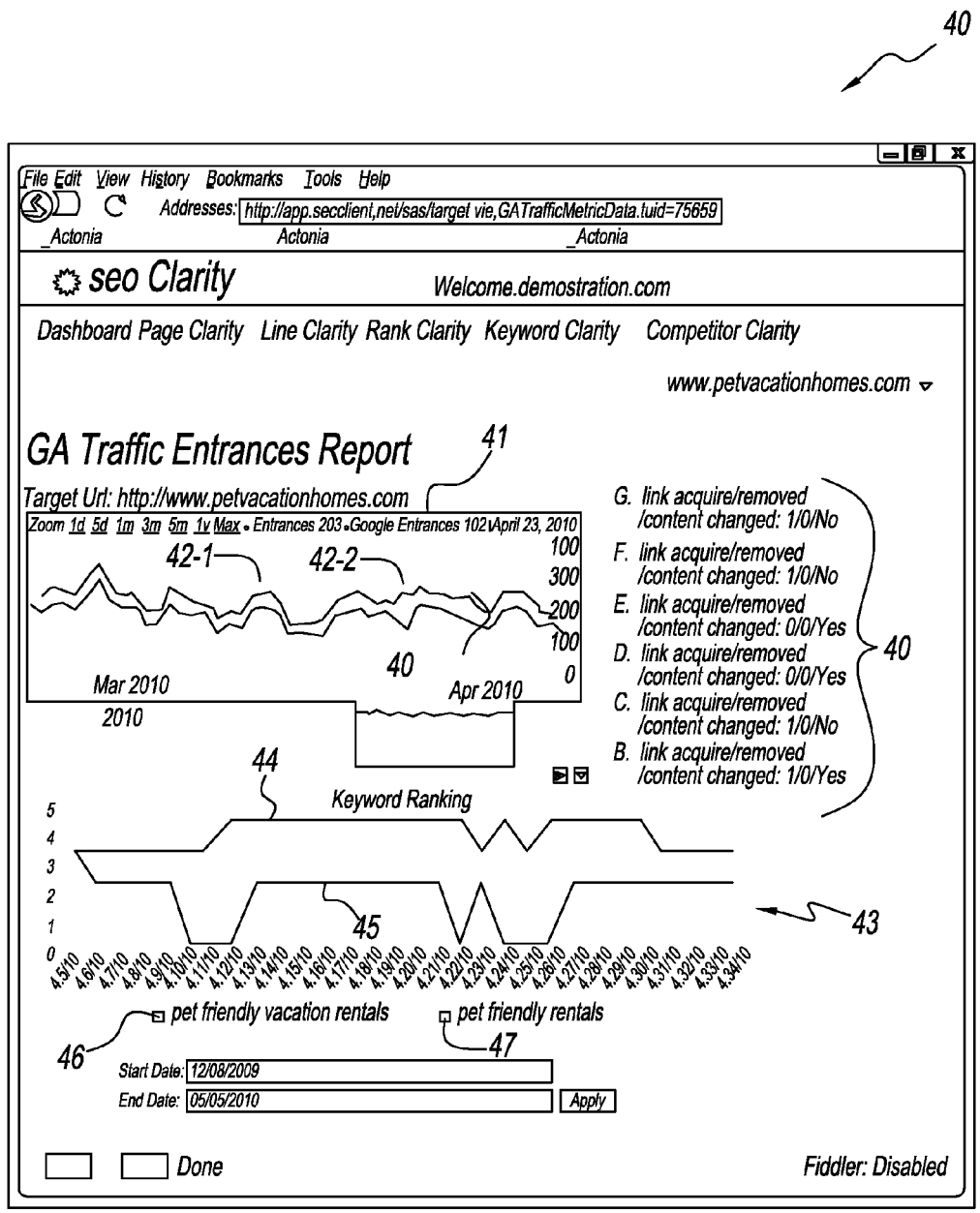
FIG. 4 is a screenshot of a report displayed to a user (e.g. a search engine optimizer) detailing changes in traffic, rankings related to changes in webpage content and count of keywords driving traffic in accordance with an embodiment of the disclosure.

FIG. 4 shows a screenshot of a target URL detail report 40 regarding a particular website (e.g. site 11 in FIG. 1A). The report includes traffic chart; keyword ranking chart; and count of keywords driving traffic as the first three panels. Graph 41 showing traffic to the site over a specified time period (in this embodiment, selectable between 1 day and at least 4 weeks). The keyword ranking chart of the target site by the search engine, over a given period of time, is shown in graph 42. In this report 40, the target URL is "http://www.petvacationhomes.com/" and rankings for key phrases "pet friendly vacation rentals" 42-1; "pet friendly rentals" 42-2; "pet vacation homes" 42-3; "pet friendly vacation rentals Florida" 42-4; and "pet friendly vacations" 42-5 vacation homes" 42-3; are given in graph 42. Graph 43 shows "keyword count driving traffic". This detail report 40 thus shows automatic logging 42 of content changes; automatic flagging on graph 41 showing traffic to a specific page; automatic flagging of links acquired or removed; and ranking 44, 45 for keywords 46, 47 on graph 43.

Figure 5:
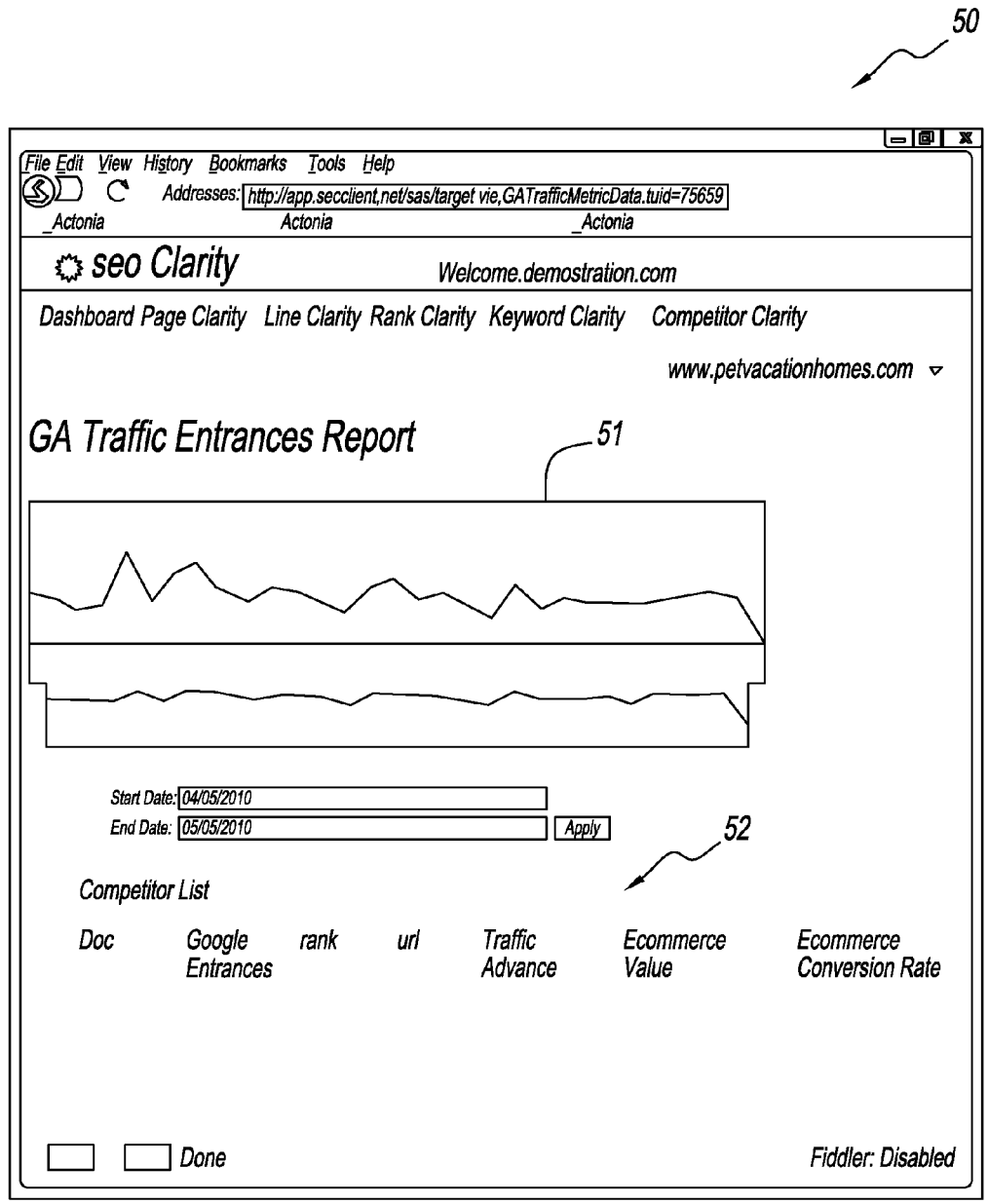
FIG. 5 is a screenshot of a report displayed to a user (e.g. a search engine optimizer) detailing the relationship between rankings and traffic from a given keyword, in accordance with an embodiment of the disclosure.

FIG. 5 shows a screenshot of a keyword detail report 50 regarding a particular keyword (e.g. keyword 15 in FIG. 1B). The report includes a graph 51 showing the relationship between ranking and traffic from that keyword. Another portion of the report shows a list 52 of competitors' websites and their rankings.

It will be appreciated that keyword detail report 50 is the counterpart of target URL detail report 40. These displayed reports permit the user 10 to visualize the impact of webpage changes on traffic to the page, as well as rankings for keywords related to the page. Furthermore, the displayed reports permit the user 10 to visualize the cause-and-effect relationship between a keyword and its rankings, to better understand whether, and by how much, rankings influence variations in traffic.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method for optimizing search engine results relating to a website, comprising the steps of:
    utilizing a computing device and a display with instructions to automatically perform
    a computer program comprising the steps of:
        continually monitoring, logging, and storing content of the website;
        continually comparing present content of the website with past content of the website to determine changes in content of the website;
        continually logging traffic to the website;
        analyzing data regarding said traffic to determine a relationship between said changes in content and changes in said traffic;
        continually monitoring the website for changes in a number of links to the website;
        continually logging and storing the links acquired by the website and removed from the website;
        analyzing data regarding said links to determine a relationship between said changes in the number of links and changes in said traffic;
        continually monitoring ranking of said website in results of a search performed by the search engine, in accordance with a keyword used to specify said search;
        continually logging and storing the changes in content of the website, the traffic to the website, and the ranking of the website;
        aggregating data regarding use of a selected keyword and the ranking of said website in results of searches including that keyword;
        analyzing said aggregated data to determine a relationship between said selected keyword and said ranking;
        displaying said relationships to a user on said display to show the continual changes in the content of the website and their continuing effect on the traffic to the website and on the ranking of the website; and
        displaying at least one chronological graph showing on a daily basis the traffic to the website, the ranking of the website by the keyword, a log of the changes in content of the website, and a log of the changes in the number of links to the website.

2. A method according to claim 1, wherein said changes in content and said changes in the number of links are performed by the user.

3. A method according to claim 1, wherein said computer program further comprises the steps of:
calculating a benchmark characterized as a desired effect regarding a change in the traffic to the website or a change in the ranking of the website; and
evaluating an effect of changing content or changing the number of links in accordance with the benchmark.

4. A method according to claim 3, wherein said method is performed by a plurality of users, and said calculating is performed in accordance with data aggregated from the plurality of users.

5. A method according to claim 1, wherein said displaying step comprises displaying a report of the traffic to the website over a first specified time period, or displaying a report of the ranking of the website over a second specified time period.

6. A method according to claim 1, wherein said computer program further comprises performing said method with respect to at least one additional website characterized as a competitor website.

7. A computer-readable non-transitory storage medium having stored therein instructions for performing a method for optimizing search engine results relating to a website, the method comprising:
continually monitoring, logging, and storing content of the website;
continually comparing present content of the website with past content of the website to determine changes in content of the website;
continually logging traffic to the website;
analyzing data regarding said traffic to determine a relationship between said changes in content and changes in said traffic;
continually monitoring the website for changes in a number of links to the website;
continuously logging and storing the links acquired by the website and removed from the website;
analyzing data regarding said links to determine a relationship between said changes in the number of links and changes in said traffic;
continually monitoring ranking of said website in results of a search performed by the search engine, in accordance with a keyword used to specify said search;
continually logging and storing the changes in content of the website, the traffic to the website, the number of links to the website including the links acquired by and removed from the website, and the ranking of the website;
aggregating data regarding use of a selected keyword and ranking of said website in results of searches including that keyword;
analyzing said aggregated data to determine a relationship between said selected keyword and said ranking;
displaying data regarding said relationships; and
displaying at least one chronological showing on a daily basis the traffic to the website, the ranking of the website by the keyword, a log of the changes in content of the website, and a log of the changes in the number of links to the website.

8. The computer-readable non-transitory storage medium according to claim 7, wherein the method further comprises:
calculating a benchmark characterized as a desired effect regarding a change in the traffic to the website or a change in the ranking of the website; and
evaluating an effect of changing the content or changing the number of links in accordance with the benchmark.

9. The computer-readable non-transitory storage medium according to claim 7, wherein the method further comprises performing the method with respect to at least one additional website characterized as a competitor website.

10. A system for optimizing search engine results relating to a website, comprising:
a server configured to:
continually monitor, log, and store content of the website;
continually compare present content of the website with past content of the website to determine changes in content of the website;
continually log traffic to the website;
continually monitor the website for changes in a number of links to the website:
continually log and store the links acquired by the website and removed from the website;
analyze data regarding said links to determine a relationship between said changes in the number of links and changes in said traffic;
continually monitor ranking of the website in results of a search performed by the search engine, in accordance with a keyword used to specify said search;
continually log and store the changes in content of the website, the traffic to the website, and the ranking of the website;
aggregate data regarding the traffic to the website and the ranking of the website for each keyword; and
analyze the aggregated data to determine a relationship between said changes in content and the changes in said traffic, and a relationship between a selected keyword and said ranking;
a storage device accessible to the server and configured to store said aggregated data and data regarding said relationships; and
a display device connected to the server and configured to display said data regarding said relationships to a user to show the continual changes in the content of the website and their continuing effect on the traffic to the website and on the ranking of the website, and to display at least one chronological graph showing on a daily basis the traffic to the website, the ranking of the website by the keyword, a log of the changes in content of the website, and a log of the changes in the number of links to the website.

11. A system according to claim 10, wherein the server is further configured to:
calculate a benchmark characterized as a desired effect regarding a change in traffic to the website or a change in the ranking of the website; and
evaluate an effect of changing the content or changing the number of links in accordance with the benchmark.

12. A system according to claim 10, wherein the server is further configured to do identical steps, as it is configured to do for the website, for at least one additional website characterized as a competitor website.

13. A system according to claim 10, wherein the storage device is remote from the server and accessible thereto over the Internet.

14. A system according to claim 11, wherein the server is configured to calculate the benchmark in accordance with data aggregated by a plurality of users of the system.

* * * * *